United States Patent
Mitani

[11] Patent Number: 6,125,061
[45] Date of Patent: Sep. 26, 2000

[54] SEMICONDUCTOR DEVICES WITH BUILT-IN FLASH MEMORY CAPABLE OF EASILY INCREASING MEMORY CAPACITY BY INTERCONNECTING THEM, AND STORAGE DEVICE PROVIDED WITH SEMICONDUCTOR DEVICE

[75] Inventor: Hidenori Mitani, Hyogo, Japan

[73] Assignee: Mitsubishi Denki Kabushiki Kaisha, Tokyo, Japan

[21] Appl. No.: 09/433,713

[22] Filed: Nov. 4, 1999

[30] Foreign Application Priority Data

May 12, 1999 [JP] Japan ................................. 11-131336

[51] Int. Cl.[7] .................................................. G11C 13/00
[52] U.S. Cl. ................................ 365/185.33; 365/185.29
[58] Field of Search ........................ 365/185.33, 185.29, 365/226

[56] References Cited

U.S. PATENT DOCUMENTS 6,034,891  3/2000  Norman ............................. 365/185.33

FOREIGN PATENT DOCUMENTS

60-3776    1/1985   Japan .
1-226066   9/1989   Japan .
10-83384   3/1998   Japan .

*Primary Examiner*—Terrell W. Fears
*Attorney, Agent, or Firm*—McDermott, Will & Emery

[57] ABSTRACT

A built-in flash memory and an ATA controller portion are integrated onto one chip, and a controller connection interface is also provided. Semiconductor devices can be interconnected by the controller connection interface. The semiconductor device senses the input conditions of control signals and a data bus according to timing at which a reset signal is cancelled immediately after power on, and determines if it is operates as an ATA controller or an expanded flash memory.

11 Claims, 6 Drawing Sheets

| | SIGNAL NAME | | | | | | |
|---|---|---|---|---|---|---|---|
| | I/O | RESET | OE# | CE# | WE# | CDE# | SC |
| CONTROLLER FUNCTION | L | L | L | L | L | L | L |
| FLASH MEMORY OPERATION | Hi-Z | H | H | H | H | H | L |

SEMICONDUCTOR DEVICES WITH BUILT-IN FLASH MEMORY CAPABLE OF EASILY INCREASING MEMORY CAPACITY BY INTERCONNECTING THEM, AND STORAGE DEVICE PROVIDED WITH SEMICONDUCTOR DEVICE

BACKGROUND OF THE INVENTION

1. Field of the Invention

The present invention relates to semiconductor devices and storage devices provided therewith. More particularly, the present invention relates to a semiconductor device with a built-in flash memory, and a storage device provided therewith.

2. Description of the Background Art

As the storage capacity of flash memories increases, they have recently been used as external storage devices for portable information systems by taking advantage of their higher resistance to vibration compared with hard disc devices and the like. However, the product specification of flash memories varies from one company to another, which makes it difficult to directly connect them to the portable information systems.

In order to solve this problem, the PCMCIA-ATA (Personal Computer Memory Card International Association-AT Attachment) method has been employed as an example. PC cards, CompactFlash™ and the like based on the PCMCIA-ATA method (hereinafter, referred to as ATA cards) have the same unit of data rewriting as hard disc devices because emulation of a hard disc device is carried out in ATA cards.

Thus, the ATA cards can be accessed similarly to hard discs.

In order to maintain the comparability, it is necessary that the cards have a built-in ATA controller LSI. Thus, the price of an ATA card is increased. To reduce the price of an ATA card, one-chip ATA controllers with a built-in flash memory are being developed which are each formed by integrating a flash memory and an ATA controller LSI on one chip.

The ATA card is typically formed of a flash memory, an ATA controller LSI for flash memory control and management, and peripheral circuitry. The card storage capacity is determined by the number of connected flash memories which can be controlled by the ATA controller LSI.

By forming an ATA controller LSI and a flash memory, which has been externally connected, so that they are built in one chip, the number of components provided on the ATA card can be reduced. Thus, ATA card size reduction and cost reduction can be made possible.

Figure 7:
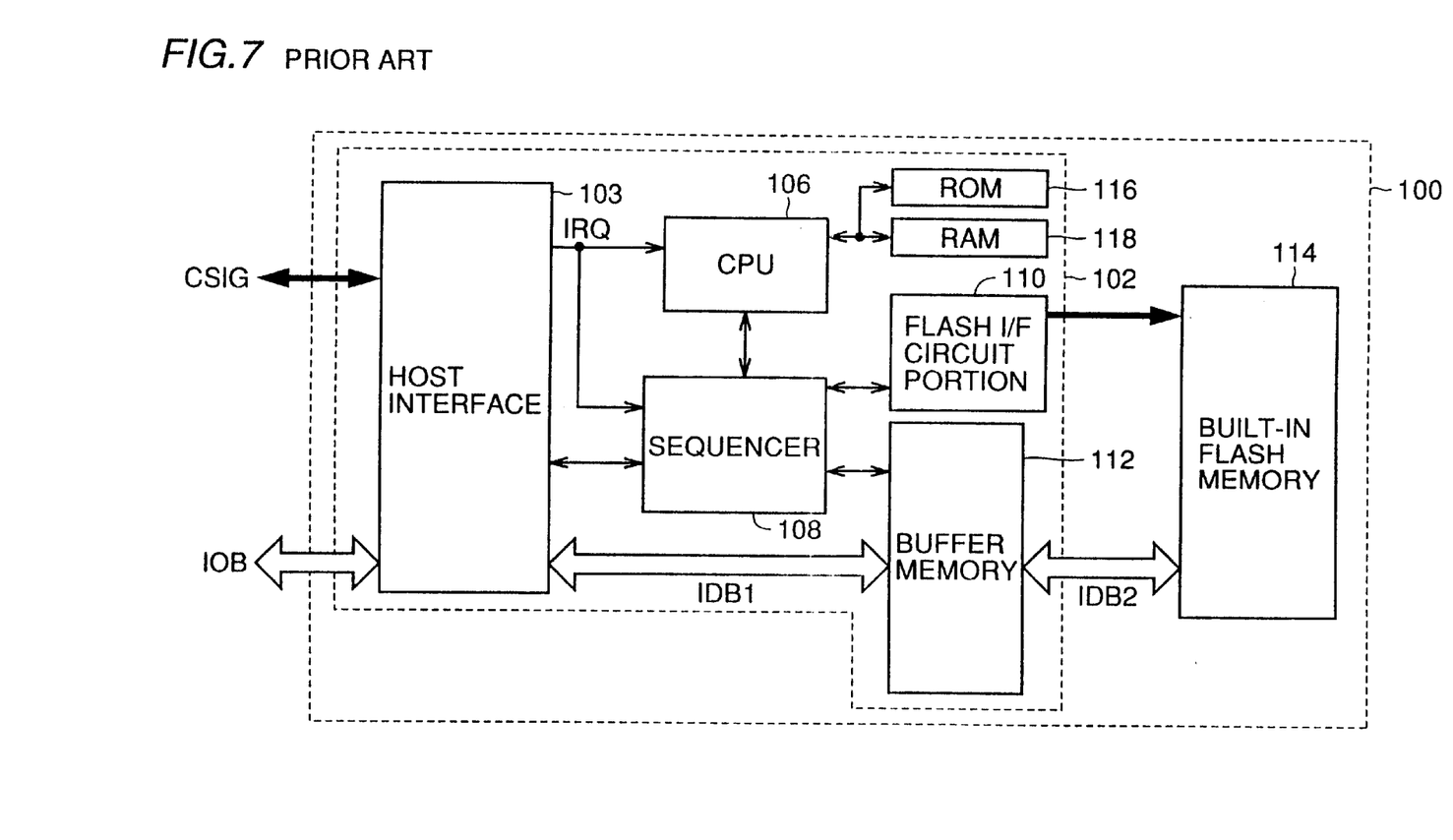
FIG. 7 is a block diagram showing a construction of a conventional one-chip ATA controller 100.

FIG. 7 is a block diagram showing a construction of a conventional one-chip ATA controller 100.

Referring to FIG. 7, one-chip ATA controller 100 includes a built-in flash memory 114, and an ATA controller portion 102 to transmit/receive data between a host system and built-in flash memory 114.

ATA controller portion 102 includes a host interface 103 which is formed of an interface based on the PC card standard, including a data bus 10B to transmit/receive data to/from the host system and a plurality of control signals CSIG, a CPU 106 which receives an interrupt signal IRQ for reading and writing requests from host interface 103 and controls ATA controller portion 102, an ROM 116 which stores a program executed by CPU 106, an RAM 118 which transmits/receives various data for program execution to/from CPU 106, a sequencer 108 which controls various circuits according to an instruction from CPU 106, a flash I/F circuit portion 110 which is controlled by sequencer 108 and outputs a necessary control signal to built-in flash memory 114, and a buffer memory 112 which serves as a data buffer when data is transmitted/received between host interface 103 and built-in flash memory 114.

In the construction of conventional one-chip ATA controller 100 shown in FIG. 7, however, the capacity of a built-in flash memory is the storage capacity of the ATA card. In order to implement memory cards, for example, which include various storage capacities according to application, it is necessary to develop and produce a plurality of one-chip ATA controllers each having a built-in flash memory of different storage capacities.

In general, semiconductor devices lose mass production cost merits as the number of types increases. Thus, the effects of cost reduction achieved by one-chip formation are not sufficiently obtained.

SUMMARY OF THE INVENTION

An object of the present invention is to provide an ATA card capable of implementing various storage capacities while taking advantage of the cost merits of mass producing semiconductor devices, and to provide a semiconductor device which enables it.

In summary, a semiconductor device according to the present invention includes a function selection circuit, a control circuit, an internal data bus, a connection circuit, and a first nonvolatile memory.

The function selection circuit selects an operation mode according to the state of an external data bus. When a main operation mode is selected as the operation mode, the control circuit receives a read request and a designated address signal from a host system and outputs a corresponding read control signal and a corresponding converted address signal, and receives read data corresponding to the converted address signal and outputs the read data to the host system. The internal data bus is used to transmit the read control signal, the converted address signal, and the read data. The connection circuit connects the external data bus and the internal data bus when the operation mode is a sub operation mode. The first nonvolatile memory receives the read control signal and the converted address signal from the internal data bus and outputs corresponding read data to the internal data bus.

According to another aspect of the present invention, a storage device includes first and second semiconductor devices and an expansion data bus.

The first semiconductor device includes a first function selection circuit, a first control circuit, a first internal data bus, a first connection circuit, an external interconnection, and a first nonvolatile memory.

The first function selection circuit selects a first operation mode according to the state of a first external data bus. When a main operation mode is selected as the first operation mode, the first control circuit receives a read request and a designated address signal from a host system and outputs a corresponding first read control signal and a corresponding first converted address signal, and receives first read data corresponding to the first converted address signal and outputs the read data to the host system. The first internal data bus is used to transmit the first read control signal, the first converted address signal, and the first read data. The first connection circuit can connect the first external data bus and the first internal data bus when a sub operation mode is selected as the first operation mode. The first nonvolatile memory receives the first read control signal and the first converted address signal from the first internal data bus and outputs the corresponding first read data to the first internal data bus.

The second semiconductor device includes a second function selection circuit, a second control circuit, a second connection circuit, and a second nonvolatile memory.

The second function selection circuit selects a second operation mode according to the state of a second external data bus. When a main operation mode is selected as the second operation mode, the second control circuit can receive a read request and a designated address signal from the host system, output a corresponding second read control signal and a corresponding second converted address signal, and receive second read data corresponding to the second converted address signal and output the read data to the host system. A second internal data bus is used to transmit the second read control signal, the second converted address signal, and the second read data. The second connection circuit connects the second external data bus and the second internal data bus when a sub operation mode is selected as the second operation mode. The second nonvolatile memory receives the second read control signal and the second converted address signal from the second internal data bus and outputs the corresponding second read data to the second internal data bus.

The external interconnection fixes the first external data bus to a state in which the first function selection circuit selects the main operation mode. The expansion data bus transmits a prescribed initial state, which corresponds to selection of the sub operation mode, output by the first control circuit from the first internal data bus to the second external data bus, and supplies the initial state to the second function selection circuit.

Therefore, a main advantage of the present invention is that the two types of chips, that is, a chip with a built-in ATA controller and a chip for a flash memory do not have to be produced, and thus production volume per chip type can be increased and mass production cost merits can be enjoyed.

Another advantage of the present invention is that the two types of chips, that is, a chip with a built-in ATA controller and a chip for a flash memory do not have to be provided, and thus production volume per chip type can be increased, mass production cost merits can be enjoyed, and reasonable storage devices can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the drawings. The same reference characters denote the same or corresponding parts in the drawings.

Figure 1:
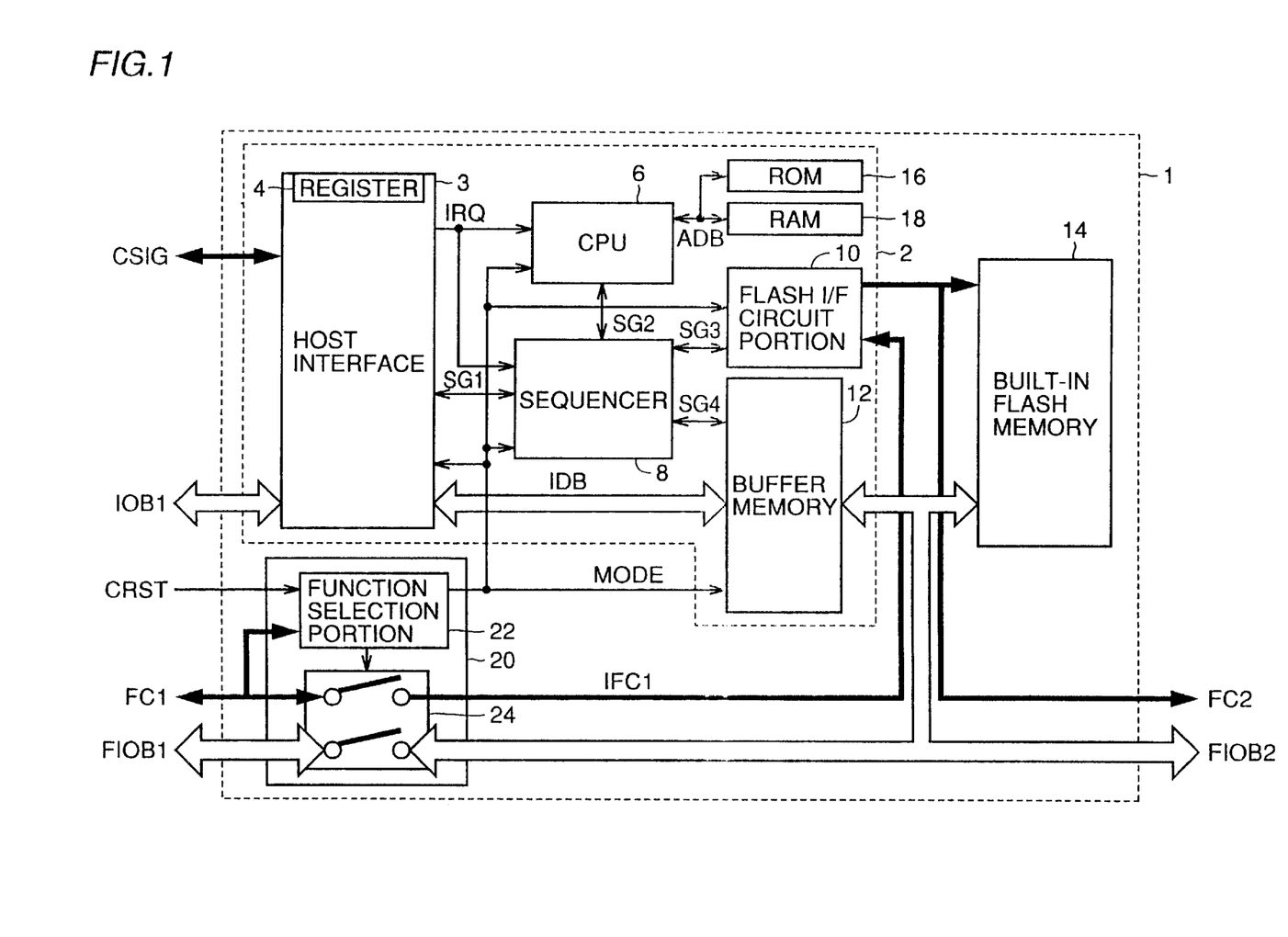
FIG. 1 is a schematic block diagram showing a construction of a semiconductor device 1 of the present invention.

FIG. 1 is a schematic block diagram showing a construction of a semiconductor device 1 of the present invention.

Referring to FIG. 1, semiconductor device 1 includes a built-in flash memory 14, an ATA controller portion 2 which controls data transmission/reception between built-in flash memory 14 and the outside, and a controller connection interface (interface for controller connection) 20 which receives a reset signal CRST and recognizes an operation mode according to the state of control signals FC1, which are input when reset signal CRST assumes a reset cancel state, and a data bus FIOB 1.

Controller connection interface 20 outputs a mode signal to ATA controller portion 2, transmits control signals FC1 as internal control signals IFC1 to ATA controller portion 2 according to an operation mode, and connects data buses FIOB1 and FIOB2 according to the operation mode.

In ATA controller portion 2, an ATA controller LSI is provided on the chip. ATA controller portion 2 includes a host interface 3 which is an interface based on the PC card standard, including a data bus IOB1 and control signals CSIG and transmits/receives data to/from the host system, a CPU 6 which receives an interrupt signal IRQ from host interface 3 when the host system issues read and write requests, an ROM 16 which stores a program operated by CPU 6, and an RAM 18 which transmits/receives various data for program execution to/from CPU 6. CPU 6 is connected to ROM 16 and RAM 18 by a bus ADB for transmitting/receiving an address and data.

ATA controller portion 2 further includes a sequencer 8 which transmits/receives a control signal SG2 to/from CPU 6 and controls the entire ATA controller portion 2, a flash I/F circuit portion 10 which receives a control signal SG3 from sequencer 8 and outputs a control signal FC2 to built-in flash memory 14, and a buffer memory 12 which receives a control signal SG4 from sequencer 8 and accordingly mediates data transmission/reception between host interface 3 and built-in flash memory 14.

A mode signal MODE is input from controller connection interface 20 to ATA controller portion 2. When mode signal MODE indicates a main operation mode in which semiconductor device 1 operates as an ATA controller with a built in a flash memory, ATA controller portion 2 operates as an ATA controller. When mode signal MODE indicates a sub operation mode in which semiconductor device 1 operates as a flash memory, host interface 3, CPU 6, sequencer 8 and buffer memory 12 become non-operative, and flash I/F circuit portion 10 receives control signal IFC1 and outputs it as control signal FC2.

Controller connection interface 20 includes a switch circuit 24 which inputs control signals FC1 as control signals IFC1 to the internal circuitry and connects data buses FIOB1 and FIOB2, and a function selection circuit portion 22 which monitors the state of control signals FC1 and data bus IOB1, receives reset signal CRST, thereafter determines an operation mode according to the timing of reset cancellation, outputs mode signal MODE, and controls switch circuit 24. The reset cancellation is generally done immediately after power on.

Figure 2:
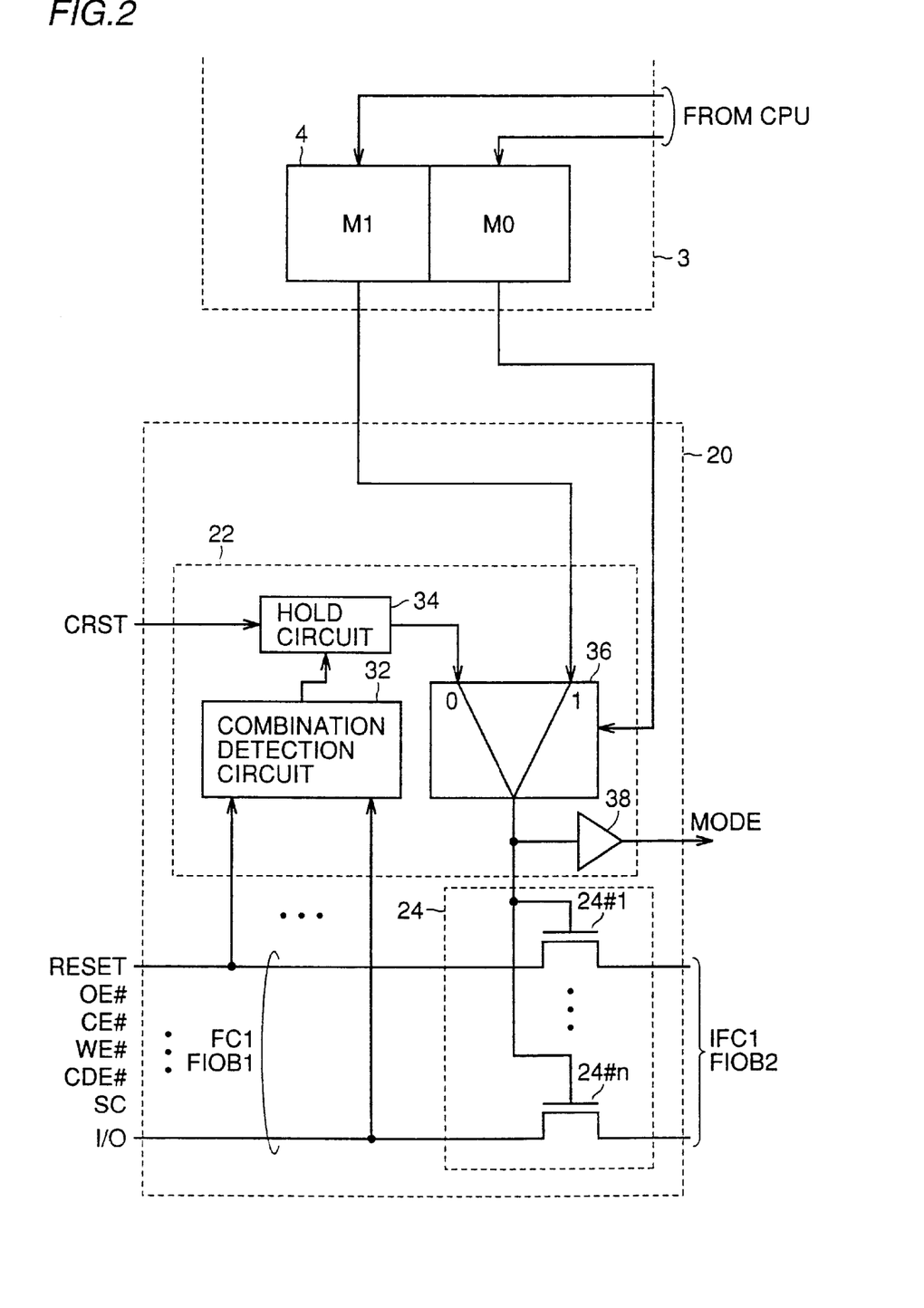
FIG. 2 is a block diagram showing a more detailed construction of controller connection interface 20 in FIG. 1.

FIG. 2 is a block diagram showing a more detailed construction of controller connection interface 20 in FIG. 1.

Referring to FIG. 2, controller connection interface 20 includes a switch circuit 24 which inputs control signals FC1 as control signals IFC1 to the internal circuitry and connects data buses FIOB1 and FIOB2, and a function selection circuit portion 22 which senses the state of control signals FC1 and data bus FIOB1, determines an operation mode according to reset signal CRST, outputs mode signal MODE, and controls switch circuit 24. Control signals FC1 and data bus FIOB1 are signals and a data bus which correspond to input/output nodes for interfacing AND type, built-in flash memory 14 shown in FIG. 1, and include signals RESET, OE#, CE#, WE#, CDE#, a clock signal SC, and a data bus I/O. Switch circuit 24 includes MOS transistors 24#1 to 24#n corresponding to these signals (n is a natural number).

Function selection circuit portion 22 includes a combination detection circuit 32 which detects if the state of control signals FC1 and data bus FIOB1 matches a prescribed combination, a hold circuit 34 which holds an output of combination detection circuit 32 in response to reset cancellation by reset signal CRST, a selector 36 which selects and outputs data held in a bit M1 of a register 4 contained in host interface 3 shown in FIG. 1 or data output from hold circuit 34 according to data held in a bit M0 of register 4, and a buffer 38 which amplifies the output of selector 36 and outputs mode signal MODE. The output of selector 36 is also supplied to the gates of MOS transistors 24#1 to 24#n.

In the following, an operation will be described briefly. Register 4 has bits M0, M1 which can hold data even if power supply is off. Bits M0, M1 both store "0" prior to factory formatting. The factory formatting means initialization of a card. Initialization of memory cards to the state when they are distributed from manufacturer factories to users is generally called factory formatting.

When semiconductor device 1 is powered on and supplied with reset signal CRST, controller connection interface 20 determines if control signals FC1 are to be input as control signals IFC1 to the internal circuitry and if data bus FIOB1 is to be connected to data bus FIOB2.

In controller connection interface 20, combination detection circuit 32 included in function selection circuit portion 22 monitors the level of an external bus signal line to see if the state of the external bus matches a prescribed combination. When reset cancellation is done by reset signal CRST, the output of combination detection circuit 32 at this time is held in hold circuit 34.

The output of hold circuit 34 and data in bit M1 of register 4 are supplied to selector 36. The data in bit M0 of register 4 determines which input signal is selected by selector 36.

When "0" is set to bit M0, selector 36 selects the output of hold circuit 34. The output of hold circuit 34 is supplied as a control signal for switch circuit 24 and is also amplified by buffer 38 and output to each block of semiconductor device 1 as signal MODE for determining an operation mode.

When "1" is set to bit M0, selector 36 selects the data in bit M1. According to the data set in bit M1, switch circuit 24 is controlled, an operation mode is determined, and signal MODE is output to each block of semiconductor device 1.

Figure 3:
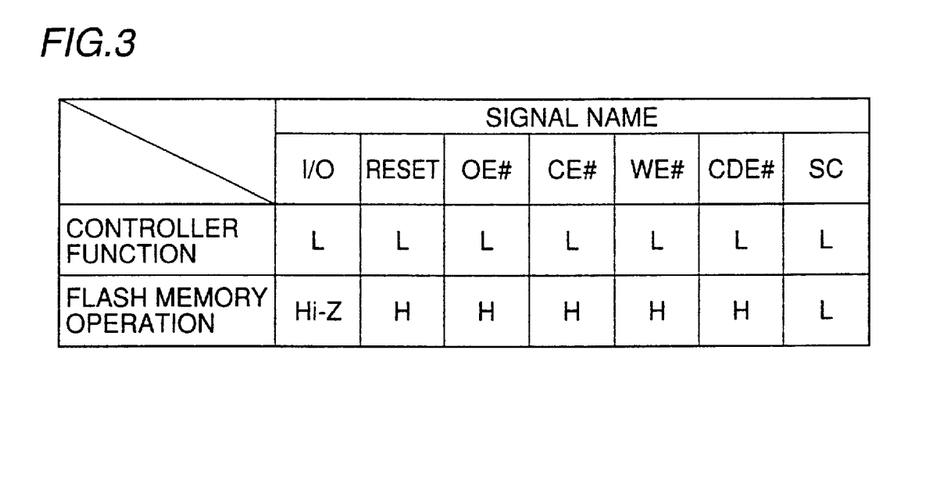
FIG. 3 is a chart for describing a combination of input signals to combination detection circuit 32 shown in FIG. 2.

FIG. 3 is a chart for describing a combination of input signals to combination detection circuit 32 shown in FIG. 2.

Referring to FIG. 3, when signals I/O, RESET, OE#, CE#, WE#, CDE# and SC are all at the L level, combination detection circuit 32 detects the main operation mode in which semiconductor device 1 shown in FIG. 1 operates as an ATA controller. When signal I/O is at the high impedance state, signals RESET, OE#, CE#, WE# and CDE# are at the H level, and signal SC is at the L level, combination detection circuit 32 detects the sub operation mode in which only built-in flash memory 14 of semiconductor device 1 can be used.

Figure 4:
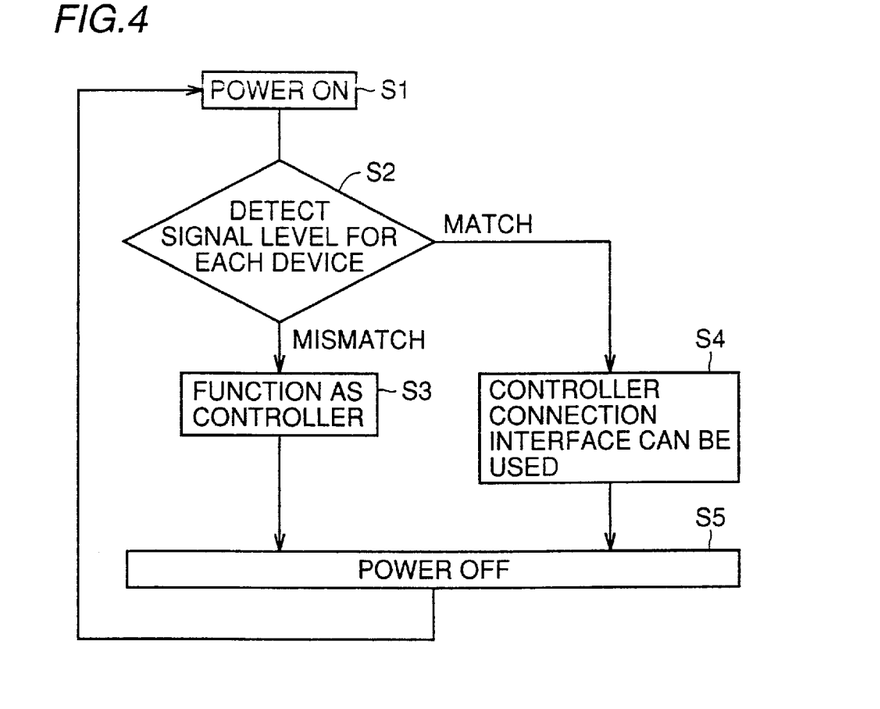
FIG. 4 is a flow chart for describing an operation of function selection circuit portion 22 shown in FIG. 2.

FIG. 4 is a flow chart for describing an operation of function selection circuit portion 22 shown in FIG. 2.

Referring to FIGS. 2 and 4, both bits M1, M0 of register 4 are set at "0" in the initial state. Register 4 is a nonvolatile rewritable register in which data is not erased even when power is turned off.

In step S1, the semiconductor device is powered on. Thereafter, reset signal CRST is supplied to hold circuit 34 and the reset state is canceled.

In step S2, combination detection circuit 32 detects a combination for each device provided on the card and, based on the result, the hold circuit holds data corresponding to an operation mode.

Signals RESET, OE#, CE#, WE# and CDE# and SC are control signals supplied to built-in flash memory 14 by flash I/F circuit portion 10 shown in FIG. 1. The data bus I/O is a data bus to transmit/receive data between buffer memory 12 and built-in flash memory 14. Immediately after power on, they have the signal combination, shown in the lower row of FIG. 3, to attain the flash memory operation.

It is assumed as an example that two semiconductor devices 1 are used for one ATA card. When control signals FC2 for the first semiconductor device are supplied as control signals FC1 for the second semiconductor device, and data bus FIOB2 for the first semiconductor device is connected to data bus FIOB1 for the second semiconductor device, the combination to carry out the flash memory operation is detected on the side of the second semiconductor device.

If control signals FC1 and data bus FIOB1 matches the signal combination for the flash memory operation in step S2, the process advances to step S4 where switch circuit 24 is rendered conductive in controller connection interface 20. ATA controller portion 2 at this time does not operate as a controller because of mode signal MODE. Semiconductor device 1 assumes the sub operation mode which causes only built-in flash memory 14 to operate.

If control signals FC1 and data bus FIOB1 do not match the combination for the flash memory operation in step S2, however, the process advances to step S3 where ATA controller portion 2 functions as a controller in semiconductor device 1.

While bit M0 of the register in FIG. 2 holds "0" data, power off in step S5 clears mode setting data, and similar operations are repeated after the process returns to step S1 and power is turned on.

In a plurality of semiconductor devices provided on a printed circuit board on a memory card, operation setting is carried out and each function is determined when power is turned on as described above. Since the function determination is canceled when power is turned off, the arrangement of providing the semiconductor devices can freely be changed before factory formatting.

Figure 5:
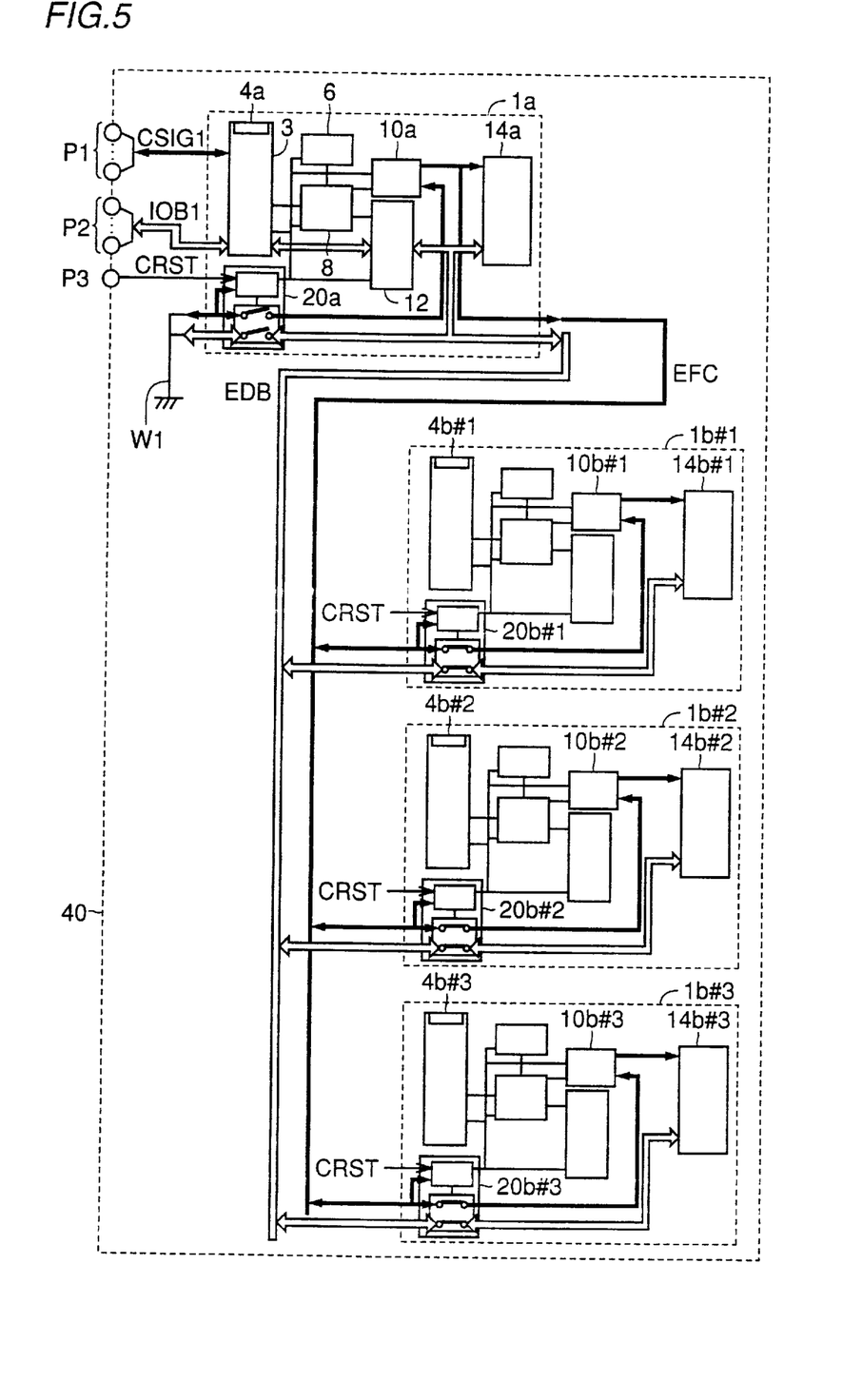
FIG. 5 shows a construction of an ATA card 40 provided with four semiconductor devices of the present invention.

FIG. 5 shows a construction of an ATA card 40 provided with four semiconductor devices of the present invention.

Referring to FIG. 5, ATA card 40 includes a semiconductor device 1a which serves as an ATA controller, semiconductor devices 1b#1 to 1b#3 which operate as expanded flash memories, terminals P1 to transmit/receive control signals CSIG1 between semiconductor device 1a and the host system, terminals P2 to transmit/receive storage data, for example, between semiconductor device 1a and the host system, and a terminal P3 which receives reset signal CRST from the host system. Semiconductor devices 1a, 1b#1 to 1b#3 each have a similar construction to the one shown in FIG. 1, and description thereof will not be repeated.

ATA card 40 further includes a data bus EDB for expansion, a bus EFC for control signals and an external interconnection W1 which are provided on a printed circuit board.

Semiconductor device 1a has its data bus FIOB2 connected to data bus EDB for expansion. Control signals FC2 are connected to bus EFC for control signals. Since semiconductor device 1a serves as a controller chip, control signals CSIG are supplied from the host system via terminals P1, and data bus IOB1 is connected to the host system via terminal P2. Control signals FC1 and data bus FIOB1 are fixed at the L level by external interconnection W1. In each of semiconductor devices 1b#1 to 1b#3, data bus FIOB1 is connected to data bus EDB for expansion, and control signals FC1 are supplied from bus EFC for control signals.

The memory card having such a construction then undergoes initialization which is called factory formatting. In an ATA card, this operation is usually carried out to attain card functions.

Figure 6:
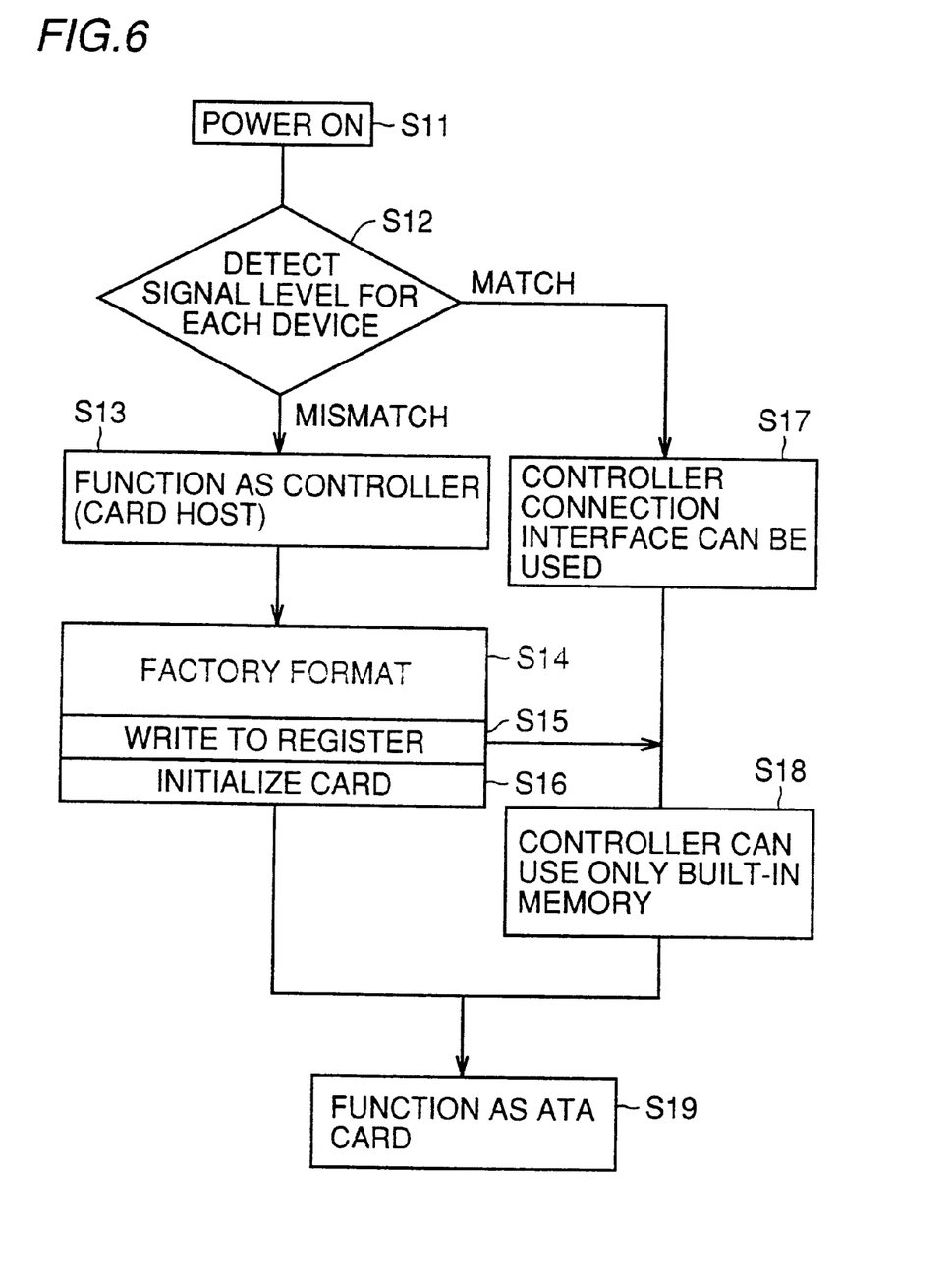
FIG. 6 is a flow chart for describing a factory formatting procedure.

FIG. 6 is a flow chart showing a factory formatting procedure.

Referring to FIGS. 5 and 6, the card is powered on in step S11. Then, the level of input signals is detected for each one-chip ATA controller with a built-in flash memory provided with the card in step S12. This detection is carried out in function selection circuit portion 22 shown in FIG. 1. If there is a device in which the level of input signals matches prescribed pin setting, the process advances to step S17. In controller connection interface 20, switch circuit 24 is rendered conductive and thus receives data from external bus EDB and control bus EFC.

If a prescribed combination does not match pin setting in step S12, the device functions as a controller (host of the ATA card).

In step S14, the device which functions as a controller undergoes factory formatting of the entire ATA card.

An assembled memory card is usually not recognized as an external storage device and does not operate even if it is connected to the host system. In order to operate the memory card just as hard disc and floppy disc devices, the following operations are carried out between the host system and the controller.

(1) Formation of a table to manage consecutive logic addresses as well as physical addresses in a memory. The table is formed in the ATA controller portion. Although the host system regards a memory card as one continuous storage device, the physical internal address (sector) is actually not continuous because there are a plurality of provided semiconductor memory devices and defective sectors. Thus, a table to manage memory sector information in the card is formed in the controller. The controller thus converts an address designated by the host system into an actual flash memory address by referring to the table in the controller.

(2) Formation of a user region used by the host system. Besides the user region, a management table and an alternative region are formed. However, they cannot be recognized from the host system.

(3) DOS formatting. The formatting includes formation of an unformatting information for a FAT system and formatting by a DOS format command. It is noted that the FAT system is a file management system usually employed in hard disc and floppy devices.

Only after the processes of (1) to (3) above in a factory, a memory card can be used as an external storage device for the host system.

During factory formatting, an operation mode is written to a register of each chip in step S15.

For example, bit M0 is set at "1" in register 4 of FIG. 2 and selector 36 controls switch 24 according to the output of bit M1 and comes to output mode signal MODE. Bit M1 of register 4 is written "0" when the chip operates as a controller.

When only a built-in flash memory of the chip is used, "1" is written to bit M1.

The contents which are set in the register are held in a nonvolatile manner and determines the operation mode of the chip till the register contents are deliberately changed thereafter. In an ATA card which has once undergone factory formatting, therefore, the operation mode of each semiconductor device provided therein is fixed. Even if power is turned off, the fixed operation mode is maintained.

In step S18, a semiconductor device which operates as an expanded flash memory is fixed to a state in which only a built-in memory can be used. In step S16, a chip which functions as a controller undergoes card initialization. Thereafter, the card functions as an ATA card in step S19.

Referring again to FIG. 5, a function of each semiconductor device in the ATA card will be described in the following.

Semiconductor device 1a is a chip which operates as an ATA controller. The ATA controller provides an interface with the host system.

In other words, when the card is inserted in the host system, the host system reads configuration information inside the card. According to the contents of information, the host system sets various registers (not shown) in controller host interface 2 and determines an interface mode. The interface mode includes memory card, I/O card and IDE modes.

Semiconductor device 1a refers to its sector information management table, and converts an address designated by the host system to an actual address of each flash memory to carry out access.

Register 4a in semiconductor device 1a stores main operation mode setting in which semiconductor device 1a operates as an ATA controller with a built-in flash memory at the time of factory formatting. Thus, the switch circuit in controller connection interface 20a is not conductive. Since registers 4b#1 to 4b#3 in semiconductor devices 1b#1 to 1b#3 store the sub operation mode in which the semiconductor devices operate as flash memories, switch circuits included in controller connection interfaces 20b#1 to 20b#3 are conductive. Since the mode of each chip is set in this manner, data transmission/reception to/from the host system is carried out as described below.

When the host system issues a read request, for example, CPU 6 in semiconductor device a outputs an address signal to ROM 16 and RAM 18 and a control signal to sequencer 8. In response, sequencer 8 forms each timing pattern and outputs a control signal to each block. Then, a series of operations of data reading from flash memories 14a, 14b#1 to 14b#3, data transfer to buffer 12, and data transfer from buffer 12 to host interface 4a are carried out.

In other words, when data is to be read from built-in flash memory 14b#l, a control signal is output from flash I/F circuit portion 10a through external control bus EFC and controller connection interface 20b#1 to flash I/F circuit portion 10b#1.

In the sub operation mode for operation as a flash memory, flash IF circuit portion 10b#1 passes, as it is, the control signal received from controller connection interface 20b#1 to built-in flash memory 14b#1.

Thus, the data is read from flash memory 14b#1 and it is input to buffer memory 12 in semiconductor device 1a through controller connection interface 20b#1 and external data bus EDB. Thereafter, the data is read from buffer memory 12 and it is output to the host system through host interface 4a.

When data is to be written, the data is passed, in an opposite order to the reading order, from the host system to flash memory 14b#1.

As described above, the semiconductor device of the present invention allows the capacity of a memory card to be easily expanded by linking a plurality of semiconductor devices of one type. Since the two types of chips, that is, a chip with a built-in ATA controller and a chip for a flash memory do not have to be produced, production volume per chip type can be increased and mass production cost merits can be enjoyed. Since it is not necessary to adjust the inventory of each chip type according to the storage capacity of memory cards to be produced, merits are also found in production management.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device, comprising:
    a function selection circuit selecting an operation mode according to a state of an external data bus;
    a control circuit receiving a read request and a designated address signal from a host system and outputting a corresponding read control signal and a corresponding converted address signal and receiving read data corresponding to said converted address signal and outputting the read data to said host system when a main operation mode is selected as said operation mode;
    an internal data bus transmitting said read control signal, said converted address signal, and said read data;
    a connection circuit connecting said external data bus and said internal data bus when a sub operation mode is selected as said operation mode; and
    a first nonvolatile memory receiving said read control signal and said converted address signal from said internal data bus and outputting corresponding said read data to said internal data bus.

2. The semiconductor device according to claim 1, wherein
    said control circuit includes an interface circuit initializing said internal data bus to a prescribed initial state after said semiconductor device is powered on when said operation mode is said main operation mode, and
    said function selection circuit selects said sub operation mode when reset cancellation is made according to a change in a reset signal if the state of said external data bus matches said prescribed initial sate.

3. The semiconductor device according to claim 2, wherein
    said function selection circuit includes
        a combination detection circuit detecting if the state of said external data bus matches said prescribed initial state,
        a hold circuit holding an output of said combination detection circuits according to a change in said reset signal after said semiconductor device is powered on, and
        an output circuit outputting a mode signal indicating said operation mode corresponding to an output of said hold circuit.

4. The semiconductor device according to claim 1, further comprising:
    a nonvolatile data register setting mode data, wherein
        said function selection circuit determines said operation mode based on said mode data if said mode data matches a prescribed set value, and determines said operation mode according to the state of said external data bus if said mode data does not match said prescribed set value.

5. The semiconductor device according to claim 4, wherein
    said function selection circuit includes
        a combination detection circuit detecting if the state of said external data bus matches a prescribed state,
        a hold circuit holding an output of said combination detection circuit according to a change in the reset signal, and
        a selection circuit receiving said mode data and an output of said hold circuit, outputting a mode signal indicating said operation mode according to said mode data if said mode data matches said prescribed value, and outputting said mode signal according to the output of said hold circuit if said mode data does not match said prescribed value.

6. The semiconductor device according to claim 1, wherein
    said control circuit receives a designated address signal and write data from said host system and outputs a write control signal, said converted address signal and said write data to said internal data bus if a write request is received from said host system when said operation mode is said main operation mode, and
    said nonvolatile memory receives said write control signal, said converted address signal and said write data from said internal data bus and holds said write data.

7. A storage device, comprising:
    first and second semiconductor devices,
    said first semiconductor device including
        a first function selection circuit selecting a first operation mode according to a state of a first external data bus,
        a first control circuit receiving a read request and a designated address signal from a host system and outputting a corresponding first read control signal and a corresponding first converted address signal and receiving first read data corresponding to said first converted address signal and outputting the read data to the host system when a main operation mode is selected as said first operation mode,
        a first internal data bus transmitting said first read control signal, said first converted address signal, and said first read data, a first connection circuit capable of connecting said first external data bus and said first internal data bus when a sub operation mode is selected as said first operation mode, and a first nonvolatile memory receiving said first read control signal and said first converted address signal from said first internal data bus and outputting corresponding said first read data to said first internal data bus, and said second semiconductor device including a second function selection circuit selecting a second operation mode according to a state of a second external data bus, a second control circuit capable of receiving said read request and said designated address signal from the host system and outputting a corresponding second read control signal and a corresponding second converted address signal and receiving second read data corresponding to said second converted address signal and outputting the read data to the host system when a main operation mode is selected as said second operation mode, a second internal data bus transmitting said second read control signal, said second converted address signal, and said second read data, a second connection circuit connecting said second external data bus and said second internal data bus when a sub operation mode is selected as said second operation mode, and a second nonvolatile memory receiving said second read control signal and said second converted address signal from said second internal data bus and outputting corresponding said second read data to said second internal data bus;

an external interconnection fixing said first external data bus to a state in which said first function selection circuit selects said main operation mode; and an expansion data bus transmitting a prescribed initial state, which corresponds to selection of said sub operation mode, output by said first control circuit from said first internal data bus to said second external data bus and supplying the prescribed initial state to said second function selection circuit.

8. The storage device according to claim 7, wherein said external interconnection fixes said first external data bus to a state different from said prescribed initial state, said first function selection circuit detects a mismatch between said first external data bus and said prescribed initial state and selects said main operation mode when reset cancellation is made, said first control circuit includes a first memory interface circuit initializing said first internal data bus to said prescribed initial state after said first semiconductor device is powered on when said first operation mode is said main operation mode, and said second function selection circuit detects a match between the state of said second external data bus and said prescribed initial state and selects said sub operation mode when reset cancellation is made.

9. The storage device according to claim 7, wherein said first semiconductor device further includes a first nonvolatile data register holding first mode data corresponding to said first operation mode, said first function selection circuit determines said first operation mode based on said first mode data if said first mode data matches a prescribed set value, and determines said first operation mode according to the state of said first external data bus if said first mode data does not match said prescribed set value, said second semiconductor device further includes a second nonvolatile data register holding second mode data corresponding to said second operation mode, and said second function selection circuit determines said second operation mode based on said second mode data if said second mode data matches said prescribed set value, and determines said second operation mode according to the state of said second external data bus if said second mode data does not match said prescribed set value.

10. The storage device according to claim 9, wherein said first data register holds said prescribed set value corresponding to said main operation mode, and said second data register holds said prescribed set value corresponding to said sub operation mode.

11. The storage device according to claim 7, wherein said first control circuit receives a designated write address signal and write data from said host system and outputs said first converted address signal, first write data and a first write control signal if a write request is received from said host system when said first operation mode is said main operation mode, said first nonvolatile memory receives said first write control signal, said first converted address signal and said first write data from said first internal data bus and holds said first write data according to said first converted address, and said second nonvolatile memory receives said first write control signal, said first converted address signal and said first write data from said second internal data bus and holds said first write data according to said first converted address when said second operation mode is a sub operation mode.

* * * * *